(12) United States Patent
Zirngast

(10) Patent No.: US 6,645,269 B2
(45) Date of Patent: Nov. 11, 2003

(54) PROCESS AND PLANT FOR PRODUCING A METAL MELT

(75) Inventor: Johann Zirngast, Marchtrenk (AT)

(73) Assignees: Voest-Alpine Industrieanlagenbau GmbH, Linz (AT); Pohang Iron & Steel Co., Ltd. (KR); Research Institute of Industrial Science & Technology, Incorporated Foundation (KR)

( * ) Notice: Subject to any disclaimer, the term of this patent is extended or adjusted under 35 U.S.C. 154(b) by 0 days.

(21) Appl. No.: 10/274,041

(22) Filed: Oct. 21, 2002

(65) Prior Publication Data

US 2003/0041690 A1 Mar. 6, 2003

Related U.S. Application Data

(63) Continuation of application No. PCT/AT01/00121, filed on Apr. 23, 2001.

(30) Foreign Application Priority Data

Apr. 28, 2000 (AT) .............................................. 752/2000

(51) Int. Cl.[7] .............................. C22B 5/14; C21B 13/14
(52) U.S. Cl. ........................................ 75/446; 266/172
(58) Field of Search ..................... 75/446, 450; 266/172

(56) References Cited

U.S. PATENT DOCUMENTS 4,806,158 A * 2/1989 Hirsch et al. .................. 75/446
5,185,032 A  2/1993 Whipp
5,584,910 A  12/1996 Kepplinger et al.
6,210,627 B1 * 4/2001 Gennari et al. ............. 266/172
6,454,833 B1 * 9/2002 Nagl et al. .................. 266/172

FOREIGN PATENT DOCUMENTS

EP  0 012 363 A1  6/1980
EP    594 557 A1  4/1994
WO  WO 97/13880 A1  4/1997

* cited by examiner

Primary Examiner—Melvyn Andrews
(74) Attorney, Agent, or Firm—Dickstein Shapiro Morin & Oshinsky, LLP

(57) ABSTRACT

In a process for producing a metal melt by reducing metal-oxide-containing material in a fluidized-bed reactor by the fluidized-bed method and by subsequently melting down the reduced material in a melt-down gasifier, in the melt-down gasifier there is generated from carbon-containing material a reducing gas which is used for reducing the metal-oxide containing material by the fluidized-bed method. Both the reducing and the melting-down are effected under atmospheric excess pressure. For the purposes of transferring the reduced material from the fluidized-bed reactor into the melt-down gasifier in a simple manner, a lower pressure is set in an intermediate vessel situated above the melt-down gasifier than in fluidized-bed reactor, and the reduced material is allowed to flow, under relaxation, upwards from the fluidized-bed reactor into the intermediate vessel and conducted from the intermediate vessel via a sluice system into the melt-down gasifier while being pressurized.

14 Claims, 2 Drawing Sheets

PROCESS AND PLANT FOR PRODUCING A METAL MELT

Figure 1:
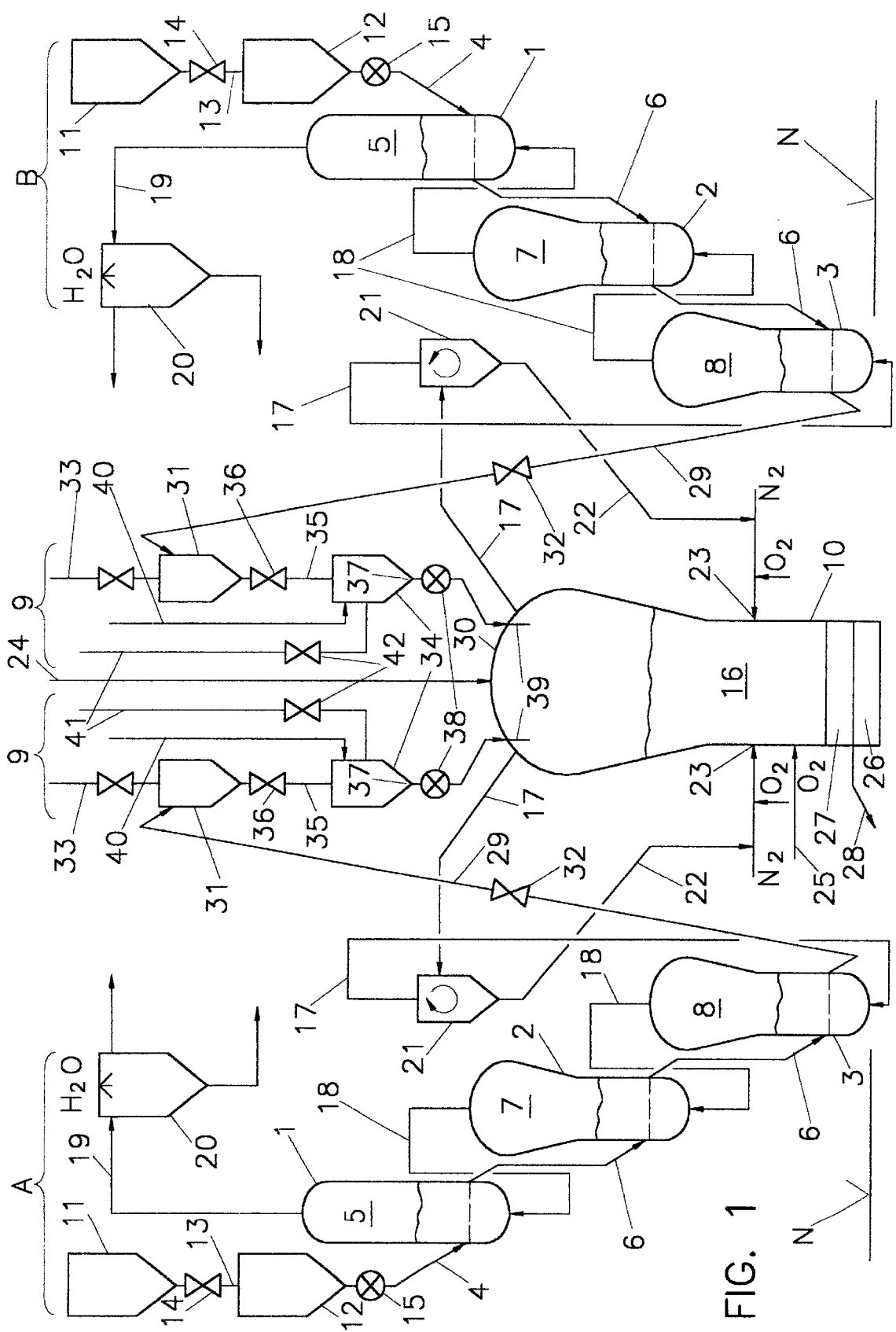

This application is a continuation Of international application number PCT AT 01/00121, filed Apr. 23, 2001, which was not published in English under PCT Article 21(2), the disclosure of which is hereby incorporated by reference.

The invention relates to a process for producing a metal melt by reducing metal-oxide-containing material, in particular iron-oxide-containing material, in a fluidized-bed reactor by the fluidized-bed method and by subsequently melting down the reduced material in a melt-down gasifier, in which there is generated from carbon-containing material a reducing gas which is used for reducing the metal-oxide-containing material by the fluidized-bed method, wherein both the reducing of the metal-oxide-containing material and the melting-down of the reduced material are effected under atmospheric excess pressure, as well as to a plant for carrying out the process.

A process of this kind is known for example from EP-A1-0 594 557 and WO 97/13880.

In order to permit a simple conveyance of the reduced material into the melt-down gasifier, the fluidized-bed reactors hitherto have been arranged at a level above a melt-down gasifier, and the reduced material from the fluidized-bed reactor has been charged into the melt-down gasifier via a conveying duct, utilizing gravitation. In plants of this kind, the conveying duct, which departs from the lower end area of the fluidized-bed reactor, runs into the upper area of the melt-down gasifier (WO 97/13880), which is designed as a dome-like gas settling space.

The charging of reduced material into the melt-down gasifier by aid of gravitational force does permit a simple charging operation but necessitates a considerable constructional height of the entire plant, given that the fluidized-bed reactors have to be arranged at a level above the melt-down gasifier. This results in relatively high investments not only for the plant itself, but also for a foundation work designed accordingly. Furthermore, a process of this kind has the disadvantage that only a single reactor line can be provided for a melt-down gasifier. This results from the spatial narrowness when arranging a reactor line above the melt-down gasifier.

From EP-A1-0 594 557 it is known to discharge reduced material from a fluidized-bed reactor by aid of discharge worms and to blow it, via sluices and by aid of a nitrogen injector, into the melt-down gasifier, namely in the area of the injecting levels for oxygen-containing gases. The sluices serve the purpose of balancing pressure differences between the fluidized-bed reactor and the melt-down gasifier.

The charging of reduced material into the melt-down gasifier by aid of a nitrogen injector does allow an arrangement of a fluidized-bed reactor at a lower level, i.e., not necessarily above the melt-down gasifier, but necessitates a relatively complex conveying means. Moreover, a process of this kind has the disadvantage that it is very difficult to charge the reduced material into the dome of the melt-down gasifier, given that the nitrogen injector causes major speeds of the reduced material at the site of introduction into the melt-down gasifier, which in turn runs counter to the function of the dome, which constitutes a gas settling space. Furthermore, the reduced material does not travel through the entire melt-down gasification zone but only through a portion of it.

The invention has as its object to further develop a process of the initially described kind so as to allow, on the one hand, for an arrangement of fluidized-bed reactors at a height level of the melt-down gasifier and, on the other hand, for a simple charging into the melt-down gasifier, in particular into its dome area, wherein neither the processes taking place in the melt-down gasifier are disturbed nor a large technical expenditure is necessary. It should be possible to charge the reduced material by utilizing gravitation.

In accordance with the invention, this task is accomplished for a process of the initially described kind by setting a lower pressure in an intermediate vessel situated above the meltdown gasifier than in the fluidized-bed reactor and by allowing the reduced material to flow, under relaxation, upwards from the fluidized-bed reactor into the intermediate vessel and conducting it from the intermediate vessel via a sluice system into the melt-down gasifier while it is pressurized, for the purpose of transferring the reduced material from at least one fluidized-bed reactor into the melt-down gasifier.

According to a preferred embodiment, the intermediate vessel is continuously filled with reduced material and continuously deaerated for reducing the excess pressure to roughly atmospheric pressure.

A preferred embodiment is characterized in that the reduced material located in the intermediate vessel is conducted, by gravitational conveyance, from the intermediate vessel into a bunker having approximately ambient pressure first, that after the bunker has been filled up with reduced material the intermediate vessel is flow-separated from the bunker, whereupon the bunker is set at least at the excess pressure given in the melt-down gasifier and the reduced material from the bunker is charged into the melt-down gasifier by gravitational force. It hereby becomes feasible to charge the reduced material without turbulences into the melt-down gasifier, preferably into its dome area, which is designed as a gas settling space.

A suitable variant is characterized in that a sluice, preferably in the form of a cellular wheel, is used for charging the reduced material from the bunker into the melt-down gasifier.

Another advantageous variant is characterized in that reduced material located in the intermediate vessel is conducted, by gravitational conveyance, from the intermediate vessel alternately into one of at least two bunkers having approximately ambient pressure first, that after one of the two bunkers has been filled up the intermediate vessel is flow-separated from the filled-up bunker, whereupon the filled-up bunker is set at least at the excess pressure given in the melt-down gasifier and the reduced material from the filled-up bunker is charged into the melt-down gasifier by gravitational force, and that during charging the reduced material into the melt-down gasifier the other bunker is filled with reduced material.

It is preferred to maintain an atmospheric excess pressure of 3 to 8 bars, preferably of 3 to 4 bars, in the melt-down gasifier.

A plant for producing a metal melt while using the process according to the invention, comprising a melt-down gasifier designed for atmospheric excess pressure, at least one fluidized-bed reactor designed for atmospheric excess pressure, a conveying means between the fluidized-bed reactor and the melt-down gasifier for conveying reduced material from the fluidized-bed reactor into the melt-down gasifier, and at least one gas connection duct between the melt-down gasifier and the fluidized-bed reactor for introducing reducing gas formed in the melt-down gasifier into the fluidized-bed reactor, is characterized in that the fluidized-bed reactor is arranged at roughly the height level of the melt-down gasifier, that the conveying means comprises a pipe which, departing from the fluidized-bed reactor, projects beyond the melt-down gasifier, that this pipe runs into an intermediate vessel having a deaerator, and that between the intermediate vessel and a fill hole provided in the dome of the melt-down gasifier for charging reduced material a sluice system is provided.

Here, the sluice system suitably is constituted by a bunker and a gastight discharge means between the bunker and the melt-down gasifier, wherein preferably the discharge means is constituted by a cellular-wheel means.

To permit a deaeration of the intermediate vessel and a pressure compensation of the bunker with the melt-down gasifier, preferably a shut-off device is provided, namely with regard to the flow, between the intermediate vessel and the bunker.

An advantageous embodiment is characterized in that a gas duct runs into the bunker to generate an excess pressure within the bunker, which gas duct is connected to a reducing-gas source or to an inert-gas source.

For the purpose of continuously charging reduced material, preferably the intermediate vessel is followed by at least two bunkers in parallel arrangement which may be flow-connected with the intermediate vessel via two connection ducts, respectively, provided with shut-off devices, respectively.

Suitably, the pipe is provided with a shut-off device, preferably closely adjacent to the fluidized-bed reactor.

The invention allows for the arrangement of several reactor lines running into a single melt-down gasifier, preferably with two or more fluidized-bed reactors being arranged next to the melt-down gasifier with regard to the level and each of the fluidized-bed reactors being flow-connected with the melt-down gasifier via an individual conveying means.

Figure 2:
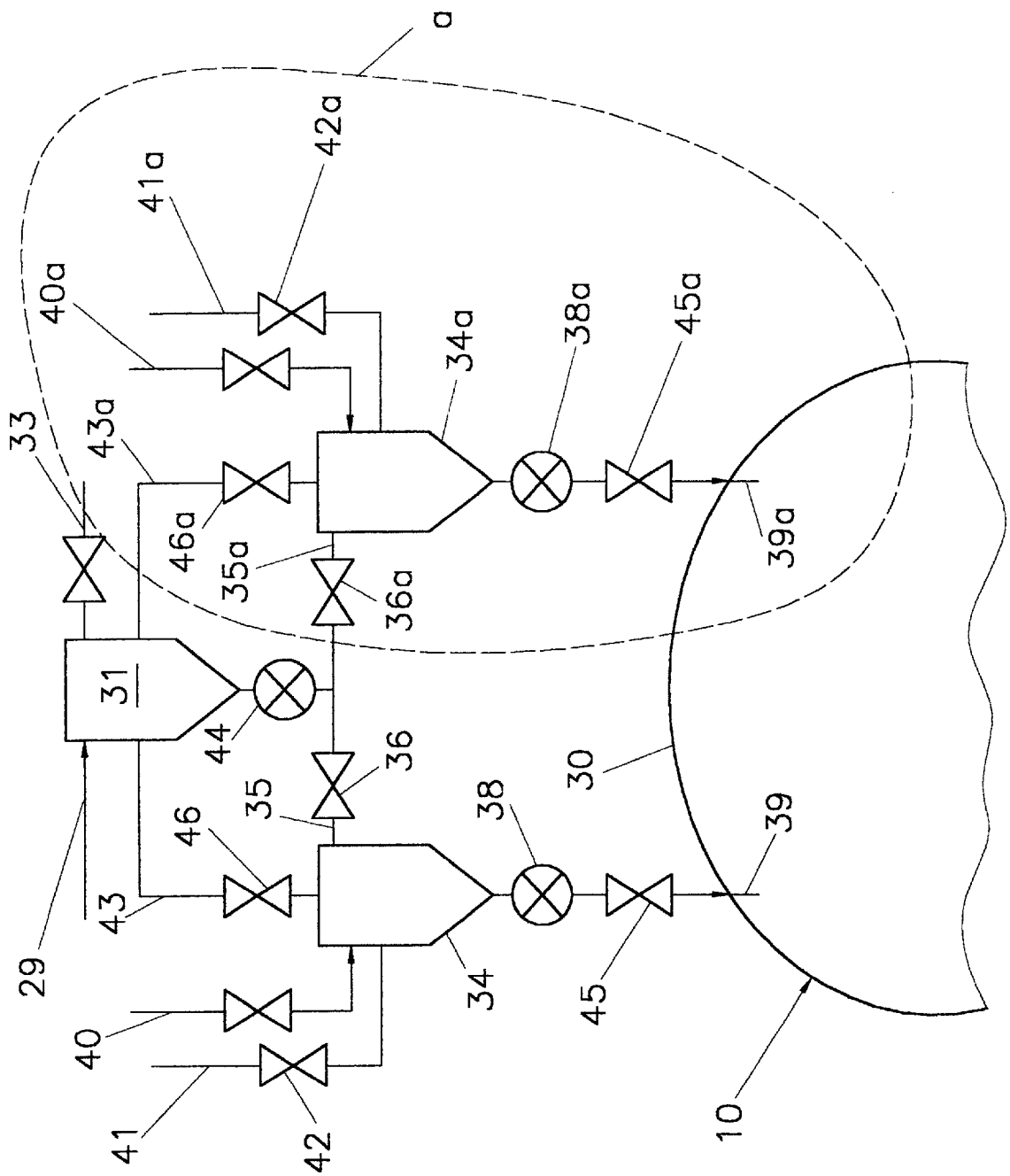

In the following, the invention will be explained in more detail with reference to two exemplary embodiments diagrammatically represented in the drawings, wherein FIG. 1 shows an overall representation of an inventive plant according to a first embodiment and FIG. 2 shows a detail of a plant according to a second embodiment.

The plant according to the invention has two reactor lines A and B, wherein each reactor line A, B is constituted by three fluidized-bed reactors 1, 2, 3 subsequently connected in series and conceived for atmospheric excess pressure (two or four fluidized-bed reactors are also possible). Via a respective ore feed duct 4, iron-oxide-containing material such as fine ore is fed in each of reactor lines A, B to respective first fluidized-bed reactor 1, in which in a pre-heating stage 5 pre-heating of the fine ore and possibly pre-reduction take place, and thereafter is conducted from fluidized-bed reactor 1 to fluidized-bed reactor 2, 3 via conveying ducts 6. In fluidized-bed reactor 2, a pre-reduction takes places in a pre-reduction stage 7, and in following fluidized-bed reactor 3, a final reduction of the fine ore to sponge iron takes place in a final reduction stage 8.

The completely reduced material, that is the sponge iron, is transferred from fluidized-bed reactor 3—arranged last in the direction of flow of the fine ore—of each of reactor lines A, B via a conveying means 9, which is explained in the following, into a melt-down gasifier 10 likewise conceived for atmospheric excess pressure. Melt-down gasifier 10 and the fluidized-bed reactor arranged last in the direction of flow of the fine ore are arranged at roughly the same height level, N.

Both melt-down gasifier 10 and fluidized-bed reactors 1 to 3 are run with an atmospheric excess pressure between 3 to 8 bars, preferably between 3 and 4 bars. For the purpose of charging the fine ore into fluidized-bed reactor 1—arranged first in the direction of flow—, two respective bunkers 11, 12, arranged to be superposed, are therefore provided in each reactor line A, B, wherein the fine ore is first charged into upper first bunker 11 and from there flows into second bunker 12, arranged below, via a pipe 13, provided with a shut-off device 14, as soon as said shut-off device 14 is opened. Then shut-off device 14 is closed, and lower bunker 12 is pressurized. After that, the fine ore can be charged into fluidized-bed reactor 1—arranged first in the direction of flow of the fine ore—via a sluice 15, e.g. a cellular-wheel sluice, arranged at the lower end of lower bunker 12.

In melt-down gasifier 10, in a melt-down gasification zone 16, a CO and $H_2$-containing reducing gas is produced from coal and oxygen-containing gas, which in each of reactor lines A, B is charged into fluidized-bed reactor 3—arranged last in the direction of flow of the fine ore—via a respective reducing-gas feed duct 17. The reducing gas is then conducted from fluidized-bed reactor 3 to fluidized-bed reactor 2 and 1 via connection ducts 18 and in counterflow to the ore flow and via a top-gas branch-off duct 19 is branched off from fluidized-bed reactor 1—arranged first in the direction of flow of the fine ore—as a top gas and is cooled and washed in a wet scrubber 20. Afterwards, the top gas may be either recirculated or used otherwise as an export gas.

In each of reducing-gas feed ducts 17, which depart from let-down gasifier 10 and run into fluidized-bed reactor 3 arranged last in the direction of flow of the fine ore, respectively, a dedusting means 21, such as a hot-gas cyclone, is provided, the dust particles separated in this cyclone being fed to melt-down gasifier 10 via a return duct 22 with nitrogen as conveying medium and via a burner 23 under oxygen injection.

Melt-down gasifier 10 has a feed duct 24 for solid carbon carriers and a feed duct 25 for oxygen-containing gases as well as, optionally, feed ducts for carbon carriers which are liquid or gaseous at room temperature, such as hydrocarbons, as well as for burnt fluxes. In melt-down gasifier 10, molten pig iron 26 and/or molten steel pre-material and molten slag 27, which are tapped via a tap 28, collect below melt-down gasification zone 16.

Advantageously, melt-down gasifier 10 is run with an atmospheric excess pressure of between 3 and 4 bars, whereas fluidized-bed reactors 1 to 3 are run with an atmospheric excess pressure of between 2 and 4 bars on account of losses given in the feed duct for the reducing gas, with the pressure in fluidized-bed reactor 3—arranged last in the direction of flow of the fine ore—being about half a bar lower than in melt-down gasifier 10 and a further pressure drop of about half a bar per fluidized-bed stage being given up to fluidized-bed reactor 1—arranged first—, respectively.

Each of conveying means 9 is constructed as follows:

From fluidized-bed reactor 3—arranged last in the direction of flow of the fine ore—, which is arranged at a height level N approximately of melt-down gasifier 10, a pipe 29 leads right to above dome 30 of melt-down gasifier 10 and runs into an intermediate vessel 31, arranged above dome 30. In pipe 29 there is a shut-off device 32, preferably close to fluidized-bed reactor 3. This intermediate vessel 31 is equipped with a deaerator 32 for reducing an atmospheric excess pressure. Below intermediate vessel 31 there is provided a bunker 34, which is flow-connected with intermediate vessel 31 by a pipe 35. This pipe 35 is equipped with a shut-off device 36.

Bunker 34 is also provided above dome 30 of melt-down gasifier 10. At its lower end there is arranged an outlet aperture 37, which is flow-connected via a sluice 38, e.g. a cellular-wheel sluice, with a pipe 39, which runs into melt-down gasifier 10 in the area of dome 30.

The function of conveying means 9 is the following:

When reduced material is to be charged into melt-down gasifier 10, first of all valve 32 is opened intermittently. In the opened state, as a consequence of the excess pressure in fluidized-bed reactor 3—arranged last in the direction of flow—, material reduced by relaxation against the ambient pressure and by aid of the energy thus being liberated flows along with reducing gas into intermediate vessel 31, which is under ambient pressure or, at the most, under minimum excess pressure. The reducing gas flowing along with the reduced material is constantly branched off from intermediate vessel 31 via duct 33 and via a scrubber which is not detailed. Shut-off device 36 of pipe 35 is closed first. After intermediate vessel 31 has been filled, shut-off device 36 is opened between intermediate vessel 31 and bunker 34, whereby the reduced material flows from intermediate vessel 31 into bunker 34 by gravitational force.

After the reduced material has passed into bunker 34, shut-off device 36, provided between intermediate vessel 31 and bunker 34, is closed, and bunker 34 is brought to at least the pressure of melt-down gasifier 10. This can be done either by aid of the reducing gas generated in melt-down gasifier 10 or by aid of an inert gas fed separately. A feed duct into the bunker for reducing gas and/or, for example, nitrogen is referred to as 40.

After bunker 34 has been pressurized, the reduced material from bunker 34 can be charged into melt-down gasifier 10 by aid of sluice 38, in the represented exemplary embodiment by aid of a cellular-wheel sluice 38. Thus, the reduced material gets from bunker 34 into the area of dome 30 of melt-down gasifier 10 by aid of gravitation. Through inventive sluice system 34, 38, the reduced material gets into melt-down gasifier 10 in a dense jet of material, so that only a minor discharge of material is associated with the reducing-gas stream leaving melt-down gasifier 10.

After the reduced material from bunker 34 has been charged into melt-down gasifier 10, bunker 34 is relaxed via duct 41 by means of a valve 42, and it is available for refilling with reduced material, which can be brought from intermediate vessel 31, which has been relaxed and refilled with reduced material in the meantime, into bunker 34 again.

The invention is not limited to the exemplary embodiment represented in the drawings but may be modified in various respects. For example, it is also possible to conduct the reduced material into melt-down gasifier 10 in a continuous material flow. To achieve this, conveying means 9 is designed as represented in FIG. 2.

According to this embodiment, an individual intermediate vessel 31 is associated with two bunkers 34, which are flow-connected with this intermediate vessel 31 via connection ducts 35 and 43. In ducts 35, shut-off valves 36 as well as a cellular-wheel sluice 44 are provided; in connection ducts 43, also shut-off valves 46 are arranged. Pipes 39, departing from bunkers 34 and running into melt-down gasifier 10, respectively, are further equipped with shut-off valves 45.

In the following, the function is described for line "a", represented in the right half of FIG. 2, the components provided here being also indexed "a", in addition to the above indicated reference numerals.

When melt-down gasifier 10 is filled via line a, first shut-off valve 45a is closed to be gastight, and bunker 34a is relaxed via duct 41a by opening valve 42a. Further, a pressure compensation via duct 43a is effected by opening valve 46a. After shut-off valve 36a has been opened, reduced material from intermediate vessel 31, which in the meantime has been filled with reduced material, is charged into bunker 34a via cellular-wheel sluice 44 and duct 35a.

After that, shut-off valves 36a and 46a are closed, and via duct 40a reducing gas or inert gas is introduced into bunker 34a until it will have been brought at least to a pressure which corresponds to the pressure in melt-down gasifier 10. Afterwards, the charging of the reduced material from bunker 34a into melt-down gasifier 10 can be carried out via cellular-wheel sluice 38a and shut-off valve 45a. During this charging operation, second bunker 34 is filled in the same way as described previously for bunker 34a, so that after bunker 34a has been emptied, reduced material can be conveyed from second bunker 34 into melt-down gasifier 10. It thus becomes feasible to continuously supply melt-down gasifier 10 with reduced material, and this alternately, namely one time from bunker 34 and one time from bunker 34a.

Two reactor lines A, B are illustrated in the drawings; however, also more reactor lines could be realized. The arrangement of two or more reactor lines for a single melt-down gasifier 10 does not only result in higher performances but additionally allows for a better reducing-gas exploitation.

What is claimed is:

1. A process for producing a metal melt by reducing metal-oxide-containing material, in particular iron-oxide-containing material, in a fluidized-bed reactor by the fluidized-bed method and by subsequently melting down the reduced material in a melt-down gasifier, in which there is generated from carbon-containing material a reducing gas which is used for reducing the metal-oxide-containing material by the fluidized-bed method, wherein both the reducing of the metal-oxide-containing material and the melting-down of the reduced material are effected under atmospheric excess pressure, and wherein for the purpose of transferring the reduced material from at least one fluidized-bed reactor into the melt-down gasifier a lower pressure is set in an intermediate vessel situated above the melt-down gasifier than in the fluidized-bed reactor and the reduced material is allowed to flow, under relaxation, upwards from the fluidized-bed reactor into the intermediate vessel and conducted from the intermediate vessel via a sluice system into the melt-down gasifier while being pressurized.

2. A process according to claim 1, wherein the intermediate vessel is continuously filled with reduced material and continuously deaerated for reducing the excess pressure to roughly atmospheric pressure.

3. A process according to claim 1, wherein the reduced material located in the intermediate vessel is conducted, by gravitational conveyance, from the intermediate vessel into a bunker having approximately ambient pressure first, wherein after the bunker has been filled up with reduced material the intermediate vessel is flow-separated from the bunker, and wherein the bunker is set at least at the excess pressure given in the melt-down gasifier and the reduced material from the bunker is charged into the melt-down gasifier by gravitational force.

4. A process according to claim 3, wherein a sluice, in the form of a cellular wheel, is used for charging the reduced material from the bunker into the melt-down gasifier.

5. A process according the claim 3, wherein reduced material located in the intermediate vessel is conducted, by gravitational conveyance, from the intermediate vessel alternately into one of at least two bunkers having approximately ambient pressure first, wherein after one of the two bunkers has been filled up the intermediate vessel is flow-separated from the filled-up bunker, wherein the filled-up bunker is set at least at the excess pressure given in the melt-down gasifier and the reduced material from the filled-up bunker is charged into the melt-down gasifier by gravitational force, and wherein during charging the reduced material into the melt-down gasifier the other bunker is filled with reduced material.

6. A process according to claim 1, wherein an atmospheric excess pressure of 3 to 8 bars is maintained in the melt-down gasifier.

7. A plant for producing a metal melt while using a process according to claim 1, comprising a melt-down gasifier designed for atmospheric excess pressure, at least one fluidized-bed reactor designed for atmospheric excess pressure, a conveying means between the fluidized-bed reactor and the melt-down gasifier for conveying reduced material from the fluidized-bed reactor into the melt-down gasifier, and at least one gas connection between the melt-down gasifier and the fluidized-bed reactor for introducing reducing gas formed in the melt-down gasifier into the fluidized-bed reactor, wherein the fluidized-bed reactor is arranged at roughly the height level of the melt-down gasifier, wherein the conveying means comprises a pipe which, departing from the fluidized-bed reactor, projects beyond the melt-down gasifier, wherein the pipe runs into an intermediate vessel having a deaerator, and wherein between the intermediate vessel and a fill hole provided in the dome of the melt-down gasifier for charging reduced material a sluice system is provided.

8. A plant according to claim 7, wherein the sluice system is constituted by a bunker and a gastight discharge means between the bunker and the melt-down gasifier.

9. A plant according to claim 8, wherein the discharge means is constituted by a cellular-wheel means.

10. A plant according to claim 7, wherein with regard to the flow a shut-off device is provided between the intermediate vessel and the bunker.

11. A plant according to claim 8, wherein a gas duct runs into the bunker to generate an excess pressure within the bunker, which gas duct is connected to a reducing-gas source or to an inert-gas source.

12. A plant according to claim 8, wherein the intermediate vessel is followed by at least two bunkers in parallel arrangement which may be flow-connected with the intermediate vessel via two connection ducts, respectively, provided with shut-off devices, respectively.

13. A plant according to claim 7, wherein the pipe is provided with a shut-off device, closely adjacent to the fluidized-bed reactor.

14. A plant according to claim 7, wherein two or more fluidized-bed reactors are arranged next to the melt-down gasifier at its height level and each of the fluidized-bed reactors is flow-connected with the melt-down gasifier via an individual conveying means.

* * * * *